United States Patent
Beardsworth et al.

(10) Patent No.: US 12,115,670 B2
(45) Date of Patent: *Oct. 15, 2024

(54) EQUIPMENT SPECIFIC MOTION PLAN GENERATION FOR ROBOTIC SKILL ADAPTATION

(71) Applicant: Intrinsic Innovation LLC, Mountain View, CA (US)

(72) Inventors: Michael Beardsworth, San Francisco, CA (US); Keegan Go, Mountain View, CA (US); Nicholas Julian Cox, Mountain View, CA (US); Gregory Lawrence, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 17/551,706

(22) Filed: Dec. 15, 2021

(65) Prior Publication Data

US 2023/0182295 A1   Jun. 15, 2023

(51) Int. Cl.
  *B25J 9/16*   (2006.01)
(52) U.S. Cl.
  CPC .................................. *B25J 9/1664* (2013.01)
(58) Field of Classification Search
  CPC ...................................................... B25J 9/1664
  USPC ........................................................... 700/38
  See application file for complete search history.

(56) References Cited

U.S. PATENT DOCUMENTS

| | | |
|---|---|---|
| 5,347,459 A | 9/1994 | Greenspan et al. |
| 5,430,643 A | 7/1995 | Seraji |
| 5,434,489 A | 7/1995 | Cheng et al. |
| 5,452,238 A | 9/1995 | Kramer et al. |
| 5,499,320 A | 3/1996 | Backes et al. |
| 5,887,121 A | 3/1999 | Funda et al. |

(Continued)

FOREIGN PATENT DOCUMENTS

WO   WO2007045810   4/2007

OTHER PUBLICATIONS

Araujo et al. "Hierarchical Scheduling of Robotic Assembly Operations in a Flexible Manufacturing System," Fifth International FAIM Conference, Jun. 1995, 12 pages.
Dean et al. "An Analysis of Time-Dependent Planning," AAAI, Aug. 1988, 6 pages.
Extended Search Report and Written Opinion in International Appln. No. 19810796.3, dated Jan. 25, 2022, 10 pages.
Lewis et al., "Fault Tolerant Operation of Kinematically Redundant Manipulators for Locked Joint Failures," IEEE Transactions on Robotics and Automation, Aug. 1997, 13(4):622-629.

(Continued)

*Primary Examiner* — Md Azad
(74) *Attorney, Agent, or Firm* — Fish & Richardson P.C.

(57) ABSTRACT

Methods, systems, and apparatus, including computer programs encoded on computer storage media, for using equipment-specific sample generators to automatically adapt a skill for execution in an operating environment. One of the methods includes obtaining a skill to be executed in an operating environment having one or more robots, wherein the skill defines a sequence of subtasks to be performed by the one or more robots in the working environment. A planning process is performed to generate a motion plan for the one or more robots, including obtaining, from an equipment-specific sample generator, a plurality of equipment-specific samples for a subtask of the skill, generating, from the plurality of equipment-specific samples, a plurality of candidate motion plans, and selecting, from the plurality of candidate motion plans, a motion plan for the one or more robots to perform the skill in the operating environment.

20 Claims, 3 Drawing Sheets

(56) References Cited

U.S. PATENT DOCUMENTS

| | | | |
|---|---|---|---|
| 6,004,016 | A | 12/1999 | Spector |
| 6,292,715 | B1 | 9/2001 | Rongo |
| 6,370,573 | B1 | 4/2002 | Bowman-Amuah |
| 6,470,225 | B1 | 10/2002 | Yutkowitz |
| 6,493,607 | B1 | 12/2002 | Bourne et al. |
| 6,804,580 | B1 | 10/2004 | Stoddard et al. |
| 9,649,764 | B1 | 5/2017 | Sun et al. |
| 2004/0149065 | A1 | 8/2004 | Moran |
| 2004/0254771 | A1 | 12/2004 | Reiner et al. |
| 2009/0312867 | A1 | 12/2009 | Hasegawa et al. |
| 2014/0278091 | A1 | 9/2014 | Horvitz et al. |
| 2015/0127151 | A1 | 5/2015 | Riedel et al. |
| 2016/0023352 | A1 | 1/2016 | Kennedy et al. |
| 2018/0173206 | A1 | 6/2018 | Pollock et al. |
| 2019/0291277 | A1* | 9/2019 | Oleynik ............... B25J 9/1669 |
| 2019/0366543 | A1 | 12/2019 | Butterfoss |
| 2019/0391597 | A1* | 12/2019 | Dupuis ............... G05D 1/0289 |
| 2021/0362331 | A1* | 11/2021 | Kolluri et al. ......... G06N 20/00 |
| 2022/0024033 | A1 | 1/2022 | Butterfoss |
| 2022/0172107 | A1* | 6/2022 | Butterfoss ............. G06N 20/00 |
| 2022/0395977 | A1* | 12/2022 | Beardsworth ......... B25J 9/1656 |
| 2023/0104775 | A1* | 4/2023 | Kaur ..................... G06V 20/46 706/12 |

OTHER PUBLICATIONS

Li et al. "A Review on Integrated Process Planning and Scheduling," Int. J. Manufacturing Research, vol. 5(2), Jan. 2010, 20 pages.

Martin et al. "Technology and Innovation for the Future of Production: Accelerating Value Creation," White paper, World Economic Forum, Mar. 2017, 38 pages.

PCT International Preliminary Report on Patentability in International Appln. No. PCT/US2019/034989, dated Dec. 1, 2020, 6 pages.

PCT International Search Report and Written Opinion in International Appln. No. PCT/US2019/34989, dated Aug. 16, 2019, 8 pages.

Ruml et al. "On-line Planning and Scheduling: An Application to Controlling Modular Printers," Journal of Artificial Intelligence Research vol. 40, Feb. 2011, 54 pages.

Stilman, "Task constrained motion planning in robot joint space," Proceedings of the 2007 IEEE/RSJ International Conference on Intelligent Robots and Systems, Oct. 2007, pp. 3074-3081.

Sun et al. "A Model-Driven Approach to Support Engineering Changes in Industrial Robotics Software," International Conference on Model Driven Engineering Languages and Systems, Sep. 2012, 15 pages.

* cited by examiner

EQUIPMENT SPECIFIC MOTION PLAN GENERATION FOR ROBOTIC SKILL ADAPTATION

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

Some research has been conducted toward using machine learning to have robots automatically learn how to perform tasks. However, robots have a number of drawbacks that make traditional learning approaches unsatisfactory for practical, real-world applications.

First, robots naturally have a very complex, high-dimensional, and continuous action space. Thus, it is computationally and temporally intractable to evaluate all possible candidate actions.

An additional complication is that traditional techniques for using robotic learning for robotic control are extremely brittle. This means that even if a workable control model can be successfully trained, small changes to the task, the robot, or the operating environment can cause the model to become entirely unusable. This is a particular problem because not all robots are available in all areas or accessible for all end users. Therefore, traditional, automatically trained control models often have no usefulness outside of the same labs in which the models are trained, and thus they cannot be generalized to or used with other environments, robots, or related tasks.

SUMMARY

This specification describes how a system can automatically adapt an installation of one or more robots to perform a task having one or more subtasks defined by a skill. In this specification, a skill refers to a collection of software and data that defines parameters of a task and which provides the mechanisms for automatically adapting a robot installation to complete the task.

The adaptation techniques described below make use of equipment-specific sample generators, which are software modules that leverage prior knowledge of the properties and behavior of the equipment in order to efficiently produce samples used during the adaptation process.

Particular embodiments of the subject matter described in this specification can be implemented so as to realize one or more of the following advantages. Using equipment-specific sample generators increases the usability and reach of skill distribution systems because it allows for a greater number of robot models and environments to use skills. In addition, using sample generators makes the planning process faster because a far smaller number of candidate joint configurations needs to be considered during the initial planning process. The resulting plans are also typically better because the sample generators encapsulate expertise about efficient robot configurations and movements. Therefore, the resulting plans are generally faster, use less energy, and occupy a smaller footprint than those that would be generated by a general purpose planner. In addition, the use of equipment-specific sample generators improves the reusability of skills, which saves massive amounts of time and resources in preparing robots to perform a task. This is because the engineers setting up the task do not need to design a skill or a control policy from scratch. Instead, they can simply download the skill and an appropriate sample generator, and the system can then adapt the skill to the local environment automatically. This mechanism also allows the system to automatically adapt a skill for an environment using a robot model that the system has never seen before. Moreover, the adaptation process takes vastly less time and vastly fewer computing resources than attempting to train a control model from scratch. In addition, using equipment-specific sample generators makes the process of writing new skills themselves easier because the skill authors do not need to write sample generators or have knowledge about efficient or even possible joint configurations. Using equipment-specific sample generators also standardizes how equipment interfaces with the skill planning and execution systems, and therefore manufacturers of new equipment have some guarantees that their equipment will be compatible will the skill execution systems provided that they simply supply an appropriate sample generator.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
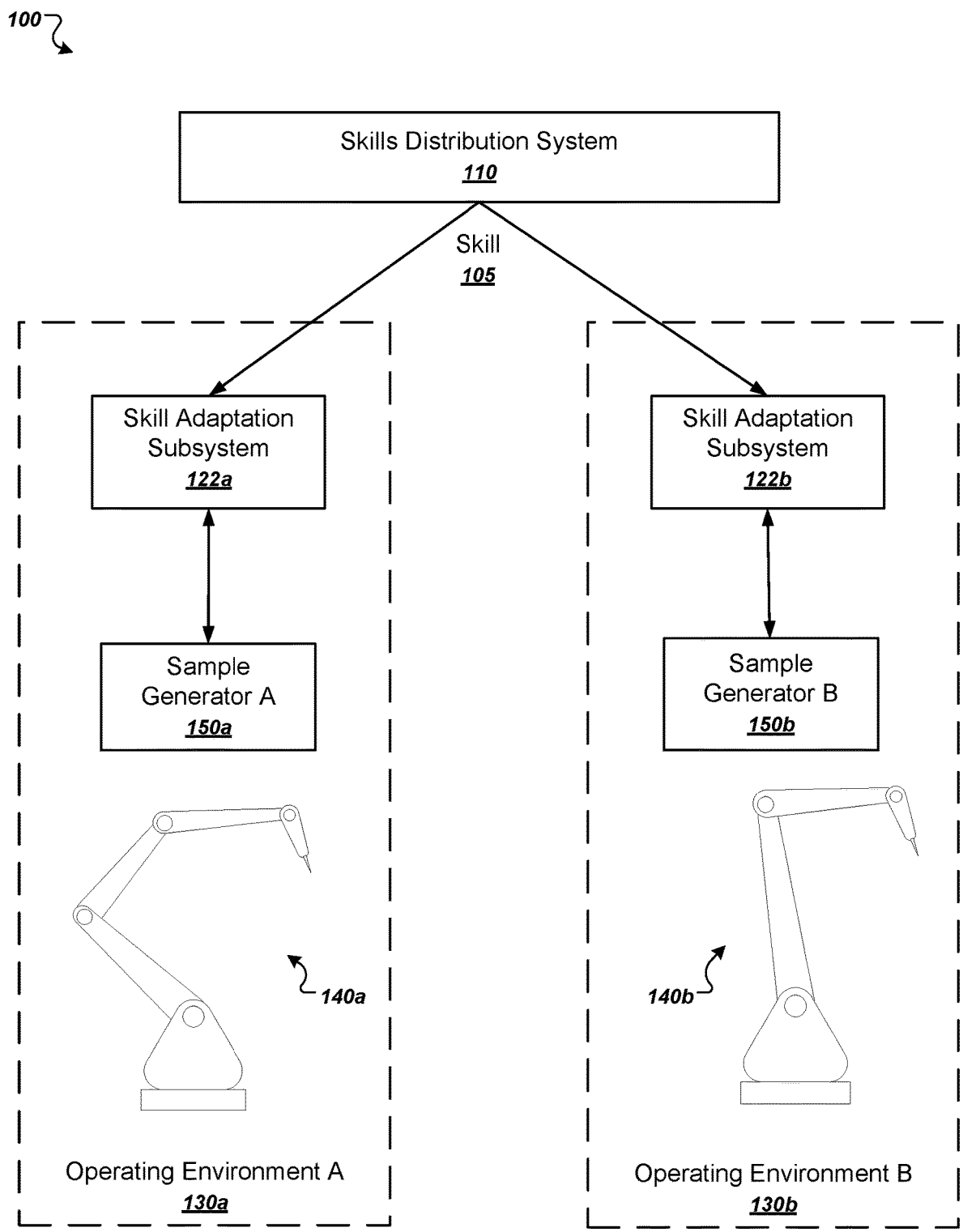
FIG. 1 is a diagram of an example system.

FIG. 1 is a diagram of an example system 100. The system 100 is an example of a system that uses equipment-specific sample generators so that a skill can be automatically adapted to execute in multiple different operating environments even when the operating environments have different equipment.

The system includes a skills distribution system 110 that can distribute a skill 105 to respective computer systems of multiple different operating environments 130a-b. The operating environment 130a includes a robot 140a with four joints, while the operating environment 130b includes a robot 140b having three joints. Despite these physical differences, the modularity and reusability of skills allows for the same skill 105 to be adapted automatically to cause each of the robots 140a-b to perform the task.

To do so, each operating environment 130a-b can use a respective skill adaptation subsystem 122a-b to adapt the skill to perform the task. Each skill adaptation subsystem 122 can be implemented using one or more computers in one of more locations. For example, each skill adaptation subsystem 122 can be a computing system that is local to each operating environment. For example, a facility that houses the robot 140a can be equipped with a computer system that implements the skill adaptation subsystem 122a and the sample generator A 150a. Alternatively or in addition, one or more skill adaptation subsystems can be a cloud-based system or part of the skills distribution system 110 that communicates with computer systems that are local to the robots 140a-b.

Each skill, which may also be referred to as a skill template, can define a state machine of subtasks and corresponding transition conditions that dictate under what conditions a robot executing the skill should make a transition from executing one subtask to executing another subtask. Suitable techniques for using skill templates are described in commonly owned U.S. patent application Ser. No. 16/880,869, which is herein incorporated by reference.

Skills are designed to be highly modular and reusable so that a skill can be developed by one entity and used by another entity without the entities having a preexisting relationship and without coordinating their activities. For example, developers for a vehicle manufacturer can develop a skill for assembling a vehicle door for a particular model of a vehicle. The skill can then be shipped to manufacturing facilities elsewhere, where the skill will be adapted to execute according to local conditions. The local conditions can include variations in robot models, lighting, workcell dimensions, and workcell conditions, to name just a few examples. But because the skill can be automatically adapted for local conditions, the same skill developed by the vehicle manufacturer can be distributed to all the different facilities, which can all assemble the vehicle door, potentially with different equipment. This approach is vastly superior to attempting to learn a reinforcement control policy from scratch because such learned policies are generally too brittle to be used in a different environment or with different robots.

As another example, a third-party developer can develop skills to be uploaded to the skills distribution system 110 for distribution to other robot installations. For example, a third-party developer can develop a skill for using an in-home consumer robot to assemble a consumer product, e.g., a bookshelf or a desk.

As another example, developers, e.g., developers associated with the skills distribution system, can develop a library of skills for a number of common robotic tasks. For example, developers can generate a skill for performing connector insertion, e.g., for HDMI or USB cables. The skill can then be distributed to robot installations elsewhere to be rapidly adapted for different local conditions, even when the other installations use different types of connectors or different robots.

A skill has associated configuration metadata that specifies one or more aspects of the local conditions under which the skill should be adapted. For example, the configuration metadata can specify a robot model identifier that represents a particular model of robot that will be executing the skill. Assigning a model identifier to a skill can be referred to as binding the skill to a robot, and the assignment can be referred to as an equipment binding for the skill. The configuration metadata can also specify a world coordinate system as well the locations of equipment in that coordinate system.

The skill adaptation subsystems 122a-b can receive the skill 105 from the skills distribution system 110 or from another source, e.g., a manufacturer or a third-party developer. The skill adaptation subsystems 122a-b can then configure the skill with configuration metadata, which sets up the skill for automatic adaptation for the operating environments. The skill adaptation subsystems 122a-b can then adapt the skill according to respective local conditions.

Adapting a skill for particular local conditions can involve multiple stages. In a first stage, a planner of the skill adaptation subsystems 122a-b can generate an initial motion plan for the robot. The initial motion plan can specify a sequence of joint configurations through which the robot control system should move the robot. In a later stage, one or more subtasks can be further refined with machine learning techniques using local demonstration data as described in U.S. patent application Ser. No. 16/880,869 mentioned above. The remainder of this specification will focus on the first stage that relates to the initial planning for the skill.

In order to generate an initial motion plan for a robot, the skill adaption subsystems 122a-b can use the equipment-specific sample generators 150a-b. Using equipment-specific sample generators means that the skill adaptation subsystems 122a-b need not be preconfigured with hard-coded knowledge about the behavior or properties of robots that the adaptation subsystems will be adapting the skill for. Rather, the sample generators 150a-b provide a layer of abstraction that allows the skill adaptation subsystem 122a-b to remain general enough to work with any appropriate robot model.

The equipment-specific sample generators 150a-b are software subsystems that generate one or more samples for a particular datatype and input parameter. In a common example, the datatype is a joint configuration and the input parameter is a location and, optionally, a requested number of samples. For example, in order to generate a plan for a connector insertion skill, a skill adaptation subsystem can use a robot-specific sample generator to generate N valid joint configurations that each position the tool of the robot within a threshold distance of a particular location in the world coordinate system of the local operating environment.

Note that in the case of robots 140a-b, the joint configurations will necessarily be significantly different because the robots 140a-b have a different number of joints. In other words, for the same skill 105, the skill adaptation subsystem 122a can generate joint angles of one or more joint configurations for the four joints of the robot 140a, while the skill adaptation subsystem 122b can generate joint angles of one or more joint configurations for the three joints of the robot 140b.

The sample generators 150a-b are also designed to be highly modular and can thus be provided by a number of different entities. In a common scenario, the sample generators 150a-b are developed by the respective manufacturers of the robots 140a-b. This arrangement improves the efficiency of the sample generation process because the robot manufacturers are likely to have the most expertise about solving for particular sample generation requests. For example, if a sample generator receives a request to generate joint configuration samples to reach a particular location, the robot manufacturer is likely to know which of multiple possible inverse kinematic solvers are best suited for that particular robot and possibly for the problem itself.

Alternatively or in addition, the sample generators can be developed by an entity that provides the skills distribution system. For example, if the skills distribution system determines that a particular robot model is particularly popular among users of skills, developers associated with the skills distribution system can generate their own sample generators for that robot model and distribute the sample generator as part of the skills package. Alternatively or in addition, the sample generators can be developed by third-party developers and can be distributed by the skills distribution system along with the skills themselves.

Figure 2:
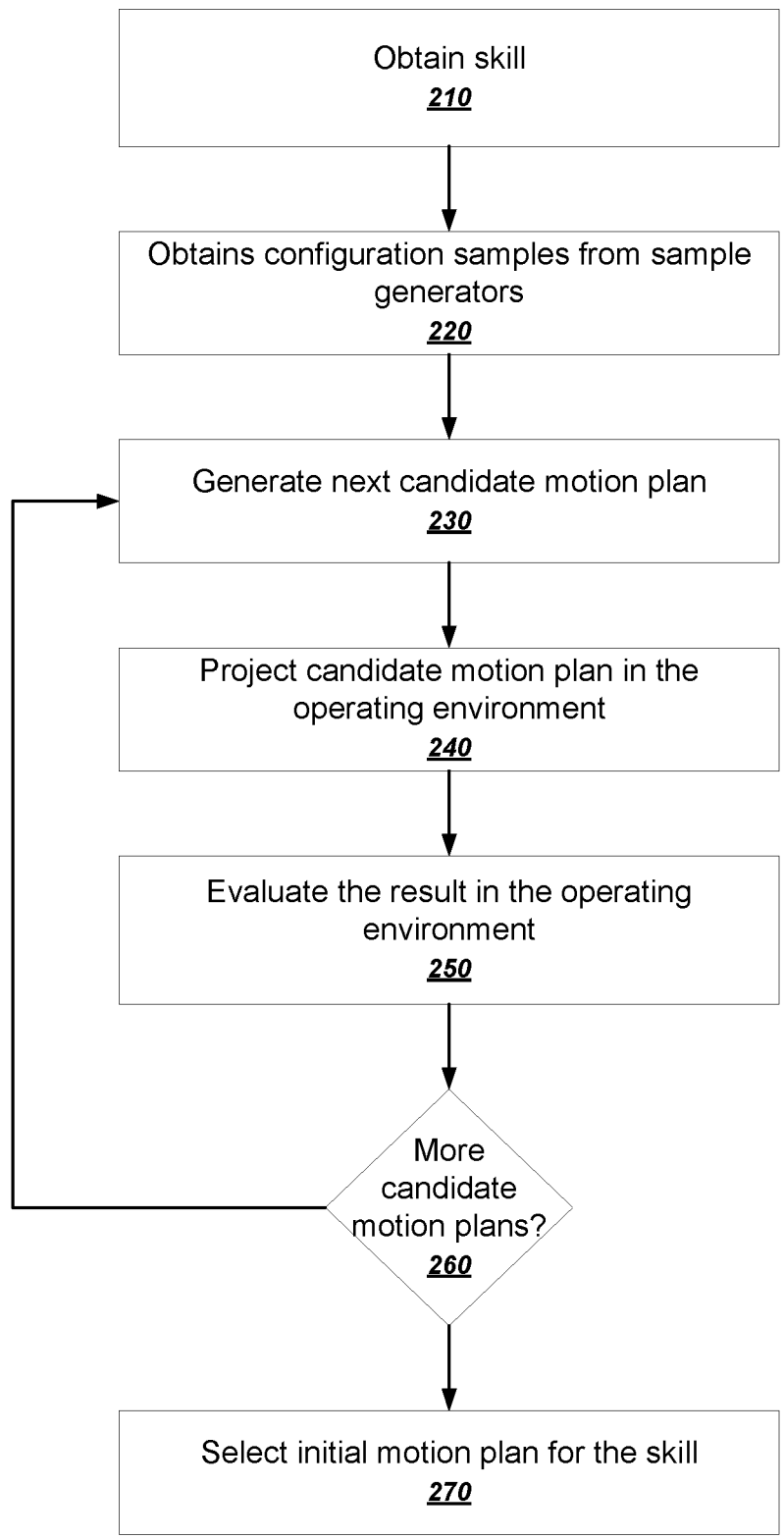
FIG. 2 is a flowchart of an example process for generating a plan for a skill using sample generators.

FIG. 2 is a flowchart of an example process for generating a plan for a skill using sample generators. As described above, adapting a skill for a particular operating environment can include generating a motion plan based on the equipment available and other local conditions. The process in FIG. 2 is an example of one such planning process. The example process can be performed by a system of one or more computers in one or more locations and programmed in accordance with this specification. The example process will be described as being performed by a system of one or more computers.

The system obtains a skill (210). As described above, because skills are modular and reusable, skills can be obtained from a variety of different sources, e.g., equipment manufacturers, product manufacturers, and third-party developers. In some implementations, the system obtains the skills through a skills distribution system that acts as a centralized location for listing skills that are available to be adapted by robot installations. A skill defines a state machine of subtasks to be performed by one or more robots. In order to execute the skill, the system will adapt the skill for particular location conditions.

The system obtains configuration samples from equipment-specific sample generators (220). Each equipment-specific sample generator encapsulates a sample generation process that is tailored to the equipment being used. This means that the planning system need not be preconfigured with knowledge about how the equipment works, and allows the planning system to adapt skills even when using robots that it has never seen before.

Each sample generator receives one or more input parameters and generates samples having a particular datatype. The datatype can for example be a joint configuration, a force, a torque, a velocity, an acceleration, or some combination of these. For example, in a simple case, a sample generator can receive a position and can generate one or more joint configurations that cause a robot to move a tool to the position or within a threshold distance of it. Another example input parameter is a measure of force that will be applied by the tool. In response, the sample generator can generate joint configuration parameters that represent applying a force that satisfies the input parameter.

As another example, the output datatype can be a partial motion plan. The sample generator can then receive two locations as input parameters and can generate multiple candidate motion plans representing how the robot should move between the two locations. The motion plans can specify joint configurations, velocities, accelerations, or some combination of these. This approach allows for specialized planning of partial motion plans to be handled by the sample generators rather than the adaptation subsystems.

The skill include configuration metadata that specifies the datatype that the sample generator should support as well as the input parameters to be used in calling the sample generators. If a sample generator does not support the required datatype, the system can raise an error to indicate that the sample generator and the skill are not compatible.

The system generates a next candidate motion plan (230). From the samples provided by the sample generators, the system can generate a next candidate motion plan. For example, each sample can represent a joint configuration for each subtask of the skill. The system can assemble the samples according to the ordering specified by the subtasks in order to generate a candidate motion plan. When the datatype being generated by the sample generator is partial motion plans, the system can assemble a full motion plan from one or more partial motion plans, one or more partial motion plans and joint configurations, or some combination of these. In some implementations, the system can evaluate all combinations of samples for each portion of the skill. But this is still computationally feasible solution because the sample generators act to greatly constrict the number of possibilities that need to be considered, rather than considering all possible vectors of floating point numbers.

The system projects the candidate motion plan in the operating environment (240). In this context, project refers to skill functionality that simulates execution of the candidate motion plan in the operating environment and records the results of the simulation. The result of the simulation can be data representing the resources required to effectuate the candidate motion plan. The resources can include a spatial footprint, an elapsed time, a required amount of power, and any safety considerations. For example, the simulation can indicate that the candidate motion plan causes a part of the robot to enter an area designated as one potentially occupied by humans according to conditions in the local operating environment.

The system evaluates the result of the simulation (250). For example, the system can use the recorded results of the simulation to evaluate the motion plans according to computed scores. For example, the system can score faster motion plans more favorably than slower motion plans, energy efficient motion plans more favorably than energy expensive motion plans, and motion plans having a smaller footprint more favorably than motion plans having a larger footprint. The result of the simulation can also indicate a likelihood that the task or subtasks would be successful, and the system can score motion plans more favorably if the motion plans are more likely to complete the task or subtasks.

In some other implementations, rather than computing a score the system can simply discard candidate motion plans that do not meet one or more criteria. For example, the system can discard plans that are too slow, occupy too large of a footprint, or that enter safety-critical areas possibly occupied by humans, to name just a few examples.

If there are more candidate motion plans to evaluate (260), the system returns to generate the next candidate motion plan (branch to 230). If not, the system selects an initial motion plan for the skill based on the evaluation.

Figure 3:
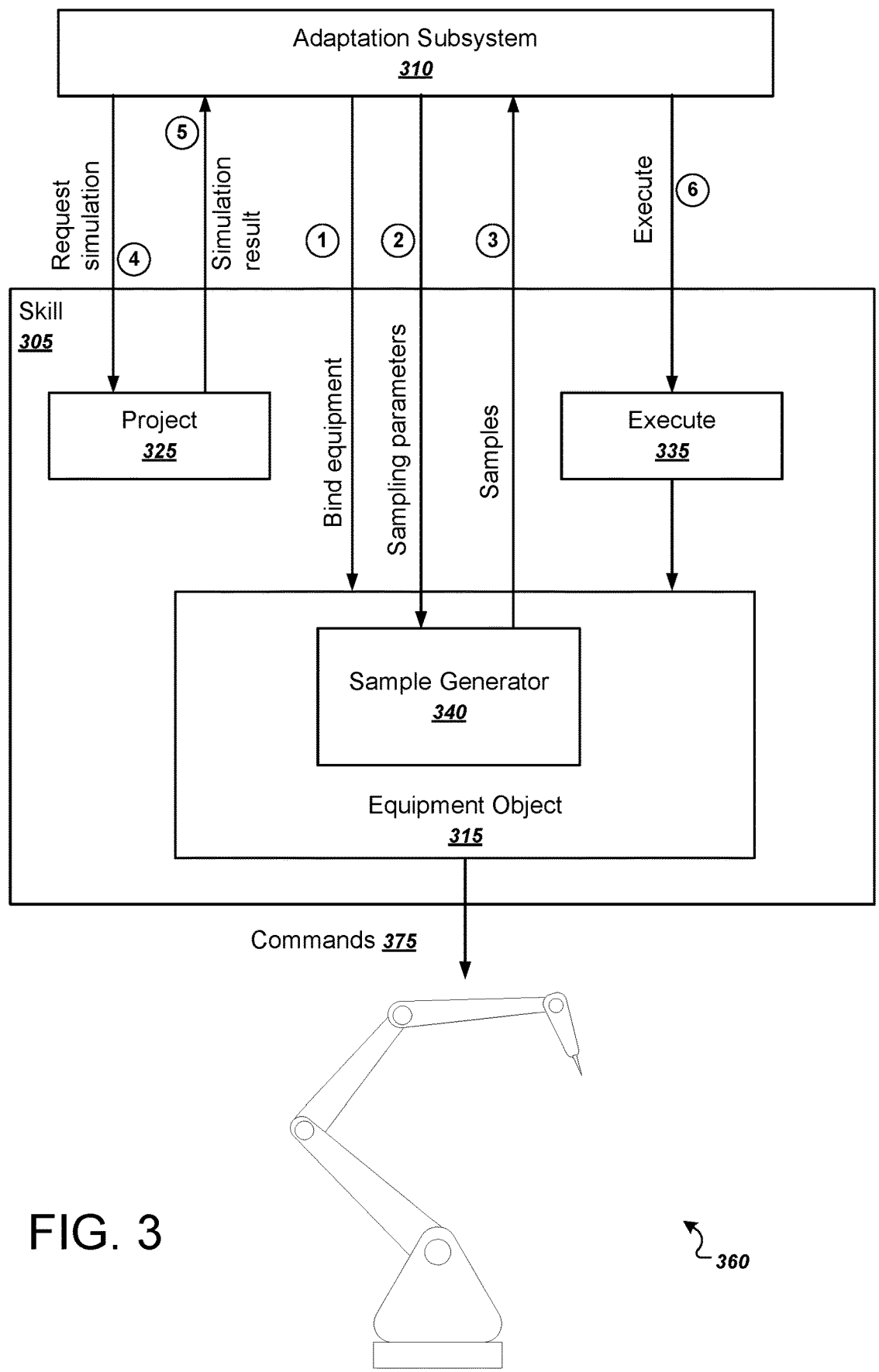
FIG. 3 illustrates the architecture of a skill and how its components work together to automatically adapt to local conditions to perform a task.

FIG. 3 illustrates the architecture of a skill and how its components work together to automatically adapt to local conditions to perform a task. In this example, an adaptation subsystem 310 uses a skill 305 and an equipment-specific sample generator 340 for a robot 360 to generate an initial motion plan.

The skill 305 has two built-in modules: project 325 and execute 335. The project module 325 receives a definition of parameters for the skill and performs a simulation to generate data representing the result of executing the subtasks of the skill according to those parameters. In this example, the input parameters for the project module 325 include an initial motion plan and a definition of dimensions and entities in the operating environment of the robot 350.

The execute module 335 actually commands the robot 360 to do something by using an equipment object 315, which is an abstracted end point for commanding the robot 360 to take action. The sample generator 340 is associated with the equipment object 315.

Because the same skill can be used to perform a task with different robots and different working environments, the equipment object 315 might not have a definition of a sample generator until the equipment binding is defined. At that point, the adaptation subsystem 310 can populate the equipment object with a sample generator according to the equipment binding or with a reference to a sample generator according to the equipment binding.

Thus, at step 1, the adaptation subsystem 310 creates an equipment binding for the equipment object 315. The equipment binding specifies the parameters of the robot 360. The adaptation subsystem 310 can then populate the sample generator 340 of the equipment object. For example, the adaptation subsystem 310 can obtain the sample generator 340 from a manufacturer of the robot 340 or from another source and populate the equipment object 315 accordingly.

At step 2, during the planning stage, the adaptation subsystem provides sampling parameters to the sample generator 340. For example, the sampling parameters can specify a position in the world coordinate system. At step 3, the sample generator 340 performs its own internal sampling procedures, e.g., using inverse kinematic solvers, to provide samples back to the adaptation subsystem 310.

At step 4, the adaptation subsystem 310 calls the project module 325 to request a simulation with a candidate motion plan generated from the samples. The project module 315 then uses the candidate motion plan to compute the effects that would occur from actually executing the candidate motion plan on the robot 360, e.g., time elapsed, swept volume, or safety issues. At step 5, the project module 325 provides the simulation result back to the adaptation subsystem 310.

The adaptation subsystem 310 will typically perform steps 4 and 5 over multiple iterations, as described above with reference to FIG. 2, in order to select an initial motion plan. After selecting an initial motion plan, the adaptation subsystem can perform further refinements, e.g., using demonstration learning or other motion planning optimizations in order to fully adapt the skill for the local operating environment.

At step 6, the adaptation subsystem 310 can request that the finalized motion plan be executed on the actual physical robot 360 by calling the execute module 335. The execute module 335 calls the equipment object 315, which can translate the finalized motion plan into low-level commands 375 that are actually executed by the robot 360 to effectuate the subtasks of the skill.

Using the techniques described in this specification can greatly aid users in a variety of complex robot planning tasks. As one illustrative example, an engineer at a manufacturing facility might be tasked with setting up a large workcell having three robots that each operate on a workpieces that are moved along by a conveyor belt. For example, a first robot can sand a surface, a second robot can drill a hole, and a third robot can attach another part to the drilled hole. Traditional robotic programming techniques would require weeks of manual programming of the robots on site in order to get the workcell up and running.

But the process is much easier when using skills having equipment-specific sample generators as described above. First, the user can position the robots in the workcell and then obtain three skills for each of the three tasks, with each skill being assigned to one of the three robots. The user can then specify a model or other identifier of the robots that are being used. The robots need not even be the same model or same manufacturer. The planning software described above can then automatically identify equipment-specific sample generators for each of the skills in order to generate candidate motion plans that work with each respective robot. Thus, the vast majority of planning process happens automatically and in a way that enables rapid workcell deployments.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot.

In this specification, a motion swept volume is a region of the space that is occupied by a least a portion of a robot or tool during the entire execution of a motion plan. The motion swept volume can be generated by collision geometry associated with the robot-tool system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by one or more computers, the method comprising:
  obtaining a skill to be executed in an operating environment having one or more robots, wherein the skill defines a sequence of subtasks to be performed by the one or more robots in the working environment; and
  performing a planning process to generate a motion plan for the one or more robots, including:
    obtaining, from an equipment-specific sample generator, a plurality of equipment-specific samples for a subtask of the skill,
    generating, from the plurality of equipment-specific samples, a plurality of candidate motion plans, and
    selecting, from the plurality of candidate motion plans, a motion plan for the one or more robots to perform the skill in the operating environment.

Embodiment 2 is the method of embodiment 1, further comprising:
  generating an equipment binding according to a model of the one or more robots; and
  obtaining the equipment-specific sample generator based on the equipment binding.

Embodiment 3 is the method of any one of embodiments 1-2, further comprising obtaining the equipment-specific sample generator from a manufacturer of the one or more robots or from a third-party developer.

Embodiment 4 is the method of any one of embodiments 1-3, further comprising:
  performing a simulation for each of the plurality of candidate motion plans to generate a simulation result from each of the candidate motion plans; and
  evaluating each of the candidate motion plans according to respective simulation results,
  wherein selecting a motion plan comprises selecting a motion plan based on a result of the evaluation.

Embodiment 5 is the method of embodiment 4, wherein evaluating each of the candidate motion plans comprises computing a score based on an elapsed time, a size of a swept volume, or energy usage of the candidate motion plans.

Embodiment 6 is the method of any one of embodiments 1-5, further comprising:
  executing the skill in the operating environment according to the selected motion plan for the skill, thereby causing the one or more robots to perform the sequence of subtasks defined by the skill.

Embodiment 7 is the method of embodiment 6, wherein executing the skill in the operating environment comprises causing a robot of the one or more robots to assume a joint configuration generated by the equipment-specific sample generator.

Embodiment 8 is the method of any one of embodiments 1-7, wherein obtaining, from the equipment-specific sample generator, a plurality of equipment-specific samples for a subtask of the skill comprises obtaining a plurality of joint configurations.

Embodiment 9 is the method of embodiment 8, further comprising:
  providing, to the equipment-specific sample generator, a location in a world coordinate system of the operating environment,
  wherein the equipment-specific sample generator outputs one or more joint configurations that position a tool of a robot within a threshold distance of the location in the world coordinate system of the operating environment.

Embodiment 10 is the method of embodiment 9, further comprising providing as an input to the sample generator a threshold number of requested joint configurations for each of one or more locations in the operating environment.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   obtaining a skill to be executed in an operating environment having one or more robots, wherein the skill defines a sequence of subtasks to be performed by the one or more robots in the working environment; and
   performing a planning process to generate a motion plan for the one or more robots, including:
      obtaining, from an equipment-specific sample generator, a plurality of equipment-specific samples for a subtask of the skill,
      generating, from the plurality of equipment-specific samples, a plurality of candidate motion plans, and
      selecting, from the plurality of candidate motion plans, a motion plan for the one or more robots to perform the skill in the operating environment.

2. The method of claim 1, further comprising:
   generating an equipment binding according to a model of the one or more robots; and
   obtaining the equipment-specific sample generator based on the equipment binding.

3. The method of claim 1, further comprising obtaining the equipment-specific sample generator from a manufacturer of the one or more robots or from a third-party developer.

4. The method of claim 1, further comprising:
   performing a simulation for each of the plurality of candidate motion plans to generate a simulation result from each of the candidate motion plans; and
   evaluating each of the candidate motion plans according to respective simulation results,
   wherein selecting a motion plan comprises selecting a motion plan based on a result of the evaluation.

5. The method of claim 4, wherein evaluating each of the candidate motion plans comprises computing a score based on an elapsed time, a size of a swept volume, or energy usage of the candidate motion plans.

6. The method of claim 1, further comprising:
   executing the skill in the operating environment according to the selected motion plan for the skill, thereby causing the one or more robots to perform the sequence of subtasks defined by the skill.

7. The method of claim 6, wherein executing the skill in the operating environment comprises causing a robot of the one or more robots to assume a joint configuration generated by the equipment-specific sample generator.

8. The method of claim 1, wherein obtaining, from the equipment-specific sample generator, a plurality of equipment-specific samples for a subtask of the skill comprises obtaining a plurality of joint configurations.

9. The method of claim 8, further comprising:
   providing, to the equipment-specific sample generator, a location in a world coordinate system of the operating environment,
   wherein the equipment-specific sample generator outputs one or more joint configurations that position a tool of a robot within a threshold distance of the location in the world coordinate system of the operating environment.

10. The method of claim 9, further comprising providing as an input to the sample generator a threshold number of requested joint configurations for each of one or more locations in the operating environment.

11. A system comprising:
    one or more computers and one or more storage devices storing instructions that are operable, when executed by the one or more computers, to cause the one or more computers to perform operations comprising:
    obtaining a skill to be executed in an operating environment having one or more robots, wherein the skill defines a sequence of subtasks to be performed by the one or more robots in the working environment; and
    performing a planning process to generate a motion plan for the one or more robots, including:
       obtaining, from an equipment-specific sample generator, a plurality of equipment-specific samples for a subtask of the skill,
       generating, from the plurality of equipment-specific samples, a plurality of candidate motion plans, and
       selecting, from the plurality of candidate motion plans, a motion plan for the one or more robots to perform the skill in the operating environment.

12. The system of claim 11, wherein the operations further comprise:
    generating an equipment binding according to a model of the one or more robots; and
    obtaining the equipment-specific sample generator based on the equipment binding.

13. The system of claim 11, wherein the operations further comprise obtaining the equipment-specific sample generator from a manufacturer of the one or more robots or from a third-party developer.

14. The system of claim 11, wherein the operations further comprise:
    performing a simulation for each of the plurality of candidate motion plans to generate a simulation result from each of the candidate motion plans; and
    evaluating each of the candidate motion plans according to respective simulation results,
    wherein selecting a motion plan comprises selecting a motion plan based on a result of the evaluation.

15. The system of claim 14, wherein evaluating each of the candidate motion plans comprises computing a score based on an elapsed time, a size of a swept volume, or energy usage of the candidate motion plans.

16. The system of claim 11, wherein the operations further comprise:
    executing the skill in the operating environment according to the selected motion plan for the skill, thereby causing the one or more robots to perform the sequence of subtasks defined by the skill.

17. The system of claim 16, wherein executing the skill in the operating environment comprises causing a robot of the one or more robots to assume a joint configuration generated by the equipment-specific sample generator.

18. The system of claim 11, wherein obtaining, from the equipment-specific sample generator, a plurality of equipment-specific samples for a subtask of the skill comprises obtaining a plurality of joint configurations.

19. The system of claim 18, wherein the operations further comprise:
    providing, to the equipment-specific sample generator, a location in a world coordinate system of the operating environment,
    wherein the equipment-specific sample generator outputs one or more joint configurations that position a tool of a robot within a threshold distance of the location in the world coordinate system of the operating environment.

20. One or more non-transitory computer storage media encoded with computer program instructions that when executed by one or more computers cause the one or more computers to perform operations comprising:
  obtaining a skill to be executed in an operating environment having one or more robots, wherein the skill defines a sequence of subtasks to be performed by the one or more robots in the working environment; and
  performing a planning process to generate a motion plan for the one or more robots, including:
    obtaining, from an equipment-specific sample generator, a plurality of equipment-specific samples for a subtask of the skill,
    generating, from the plurality of equipment-specific samples, a plurality of candidate motion plans, and
    selecting, from the plurality of candidate motion plans, a motion plan for the one or more robots to perform the skill in the operating environment.

* * * * *